(12) United States Patent
Harmon, Sr.

(10) Patent No.: US 8,061,140 B2
(45) Date of Patent: *Nov. 22, 2011

(54) HIGH EFFICIENCY MULTICYCLE INTERNAL COMBUSTION ENGINE WITH WASTE HEAT RECOVERY

(75) Inventor: James V. Harmon, Sr., Mahtomedi, MN (US)

(73) Assignee: Thermal Power Recovery LLC, Mahtomedi, MN (US)

( * ) Notice: Subject to any disclaimer, the term of this patent is extended or adjusted under 35 U.S.C. 154(b) by 212 days.

This patent is subject to a terminal disclaimer.

(21) Appl. No.: 12/539,987

(22) Filed: Aug. 12, 2009

(65) Prior Publication Data

US 2009/0293480 A1 Dec. 3, 2009

Related U.S. Application Data

(63) Continuation-in-part of application No. 12/492,773, filed on Jun. 26, 2009, now abandoned, which is a continuation-in-part of application No. 12/387,113, filed on Apr. 28, 2009, which is a continuation-in-part of application No. 12/075,042, filed on Mar. 7, 2008, now Pat. No. 7,997,080.

(60) Provisional application No. 60/905,732, filed on Mar. 7, 2007, provisional application No. 61/192,254, filed on Sep. 17, 2008, provisional application No. 61/194,608, filed on Sep. 29, 2008.

(51) Int. Cl.
| | |
|---|---|
| *F01K 23/06* | (2006.01) |
| *F01K 23/10* | (2006.01) |
| *F01K 27/00* | (2006.01) |
| *F01K 13/00* | (2006.01) |
| *F02G 3/00* | (2006.01) |
| *F02B 33/44* | (2006.01) |
| *F02B 75/28* | (2006.01) |
| *F02B 75/30* | (2006.01) |

(52) U.S. Cl. ............... 60/670; 60/597; 60/643; 60/676; 60/618; 60/616; 60/614; 123/50 R

(58) Field of Classification Search ............ 60/614–620, 60/517, 712, 670–671, 659, 688, 691–693, 60/698, 676, 678, 642–643, 650, 597–599; 91/242, 245, 471; 92/62, 65; 123/50 R, 123/73 F, 73 FA See application file for complete search history.

(56) References Cited

U.S. PATENT DOCUMENTS 753,647 A   3/1904   Thorson
(Continued)

FOREIGN PATENT DOCUMENTS

DE   3437151 A1 *  4/1986
(Continued)

OTHER PUBLICATIONS

J.R. Allen and J.A. Bursley, Heat Engines, 1925 Third Edition, pp. 210 and 211, McGraw Hill, New York, U.S.
(Continued)

*Primary Examiner* — Thai Ba Trieu
(74) *Attorney, Agent, or Firm* — Nikolai & Mersereau

(57) ABSTRACT

A high efficiency combined cycle internal combustion and steam engine includes a cylinder and a piston with an internal combustion chamber outward of the piston, a fixed cylinder cap and a steam expansion chamber inside the piston. The cylinder cap can be heated to reduce condensation of steam entering from a steam generator fired by waste combustion heat. Following exhaust, residual steam can be recompressed prior to admitting the next charge of steam. A wrist pin connected to an inner end of the piston skirt inwardly of the cylinder cap is coupled to a connecting rod secured to a crankshaft. One valve or a pair of steam inlet valves are connected to communicate in series within the cylinder cap inside the piston. The steam mass admitted is regulated to reduce fuel consumption. Coolant can be superheated in the combustion exhaust manifold.

36 Claims, 6 Drawing Sheets

U.S. PATENT DOCUMENTS

| | | | | |
|---|---|---|---|---|
| 845,622 | A | | 2/1907 | Du Shane ............... 60/617 |
| 915,103 | A | * | 3/1909 | Meyer ................ 123/73 F |
| 1,027,380 | A | | 5/1912 | Fryer |
| 1,128,125 | A | | 2/1915 | Fryer |
| 1,169,672 | A | | 1/1916 | Palm |
| 1,324,183 | A | | 12/1919 | Still |
| 1,331,665 | A | * | 2/1920 | Ohborg ................ 60/619 |
| 1,332,633 | A | | 3/1920 | Parrish |
| 1,427,395 | A | | 8/1922 | Kaschtofsky |
| 1,452,011 | A | * | 4/1923 | Watton ............... 123/73 F |
| 1,489,291 | A | | 4/1924 | Tuerk |
| 1,496,839 | A | | 6/1924 | Bohan et al. |
| 1,502,918 | A | | 7/1924 | Scott |
| 1,517,372 | A | | 12/1924 | Martineau |
| 1,542,578 | A | | 6/1925 | Pool |
| 1,601,995 | A | | 10/1926 | Butler et al. |
| 1,629,677 | A | | 5/1927 | Bull |
| 1,630,841 | A | * | 5/1927 | Fusch ................. 123/50 R |
| 1,732,011 | A | | 10/1929 | Gouirand |
| 1,758,482 | A | * | 5/1930 | Tune ................. 123/50 R |
| 1,802,828 | A | | 4/1931 | Perrenoud |
| 1,913,251 | A | | 6/1933 | Smith |
| 2,000,108 | A | | 5/1935 | Tucker |
| 2,040,453 | A | | 5/1936 | Weber |
| 2,057,075 | A | | 10/1936 | Wuehr |
| 2,063,970 | A | * | 12/1936 | Young ................ 123/50 R |
| 2,138,351 | A | | 11/1938 | McGonigall |
| 2,196,980 | A | | 4/1940 | Campbell |
| 2,402,699 | A | | 6/1946 | Williams |
| 2,943,608 | A | | 7/1960 | Williams |
| 3,100,001 | A | * | 8/1963 | Forwald ................. 92/65 |
| 3,200,798 | A | | 8/1965 | Mansfield |
| 3,650,295 | A | | 3/1972 | Smith |
| 3,908,686 | A | | 9/1975 | Carter et al. |
| 3,921,404 | A | | 11/1975 | Mason |
| 4,023,537 | A | | 5/1977 | Carter, Sr. et al. |
| 4,050,357 | A | | 9/1977 | Carter, Sr. et al. |
| 4,201,058 | A | | 5/1980 | Vaughan |
| 4,300,353 | A | | 11/1981 | Ridgway |
| 4,362,132 | A | | 12/1982 | Neuman |
| 4,377,934 | A | | 3/1983 | Marshall |
| 4,509,464 | A | | 4/1985 | Hansen |
| 4,522,163 | A | * | 6/1985 | Hooper ............... 123/73 F |
| 4,561,256 | A | * | 12/1985 | Molignoni .............. 60/670 |
| 4,590,766 | A | | 5/1986 | Striebich |
| 4,706,462 | A | | 11/1987 | Soltermack |
| 4,724,800 | A | | 2/1988 | Wood |
| 4,785,631 | A | | 11/1988 | Striebich |
| 4,928,658 | A | * | 5/1990 | Ferrenberg et al. ....... 60/517 |
| 5,121,607 | A | | 6/1992 | George, Jr. |
| 5,385,211 | A | | 1/1995 | Carroll |
| 6,457,309 | B1 | * | 10/2002 | Firey ................... 60/517 |
| 6,834,503 | B2 | | 12/2004 | Freymann |
| 6,895,756 | B2 | | 5/2005 | Schmotolocha |
| 7,056,251 | B2 | | 6/2006 | Ibaraki ................. 60/618 |
| 7,104,063 | B2 | | 9/2006 | Clemens |

FOREIGN PATENT DOCUMENTS

| | | |
|---|---|---|
| GB | 25356 | 6/1911 |
| GB | 1750 | 8/1912 |
| GB | 28472 | 7/1913 |
| GB | 125395 | 4/1918 |
| GB | 130621 | 8/1919 |
| WO | WO 0231319 | 4/2002 |
| WO | WO 03050402 | 6/2003 |

OTHER PUBLICATIONS

Jerry Peoples, Gewgaws of Production Steam, The Steam Automobile Bulletin, Sep.-Oct. 2006, vol. 20, No. 5, pp. 7-13.

J.V. Haywood, Internal Combustion Engines, McGraw-Hill Book Co. 1988 pp. 657-659.

D.A. Low, Heat Engines, Longmans, Green & Co. 1949, pp. 246-248.

Marks, et. al., Marks' Standard Handbook for Mechanical Engineers, McGraw-Hill, Inc. 9th ed. 1987, pp. 9-36 to 9-38.

An Assessment of the Technology of Rankine Engines for Automobiles. Div. of Transportation Energy Conservation, U.S. Energy Research & Develop. Admin., Apr. 1977, pp. 21-24.

Bill Cartland, Easy Starting Bash Valve, Steam Automobile Club of America, Inc. Technical Report No. 120, 1993, one page.

Ronald Loving, Low NOx Thermal Oxidizers, Steam Automobile Bulletin, vol. 20 No. 5, Sep.-Oct. 2006, pp. 28-30.

Tom Kimmel, The Leslie Engine, Steam Automobile Bulletin, vol. 21 No. 5, Sep.-Oct. 2007, pp. 14-16.

D.A. Arias, et. al., Theoretical Analysis of Waste Heat Recovery From and Internal Combustion Engine in a Hybrid Vehicle, SAE Technical Paper, 2006-01-1605, Apr. 3-6, 2006.

S.S. Miner, Developments in Automotive Steam Power Plants, SAE Technical Paper, No. 690043, Jan. 13-17, 1969.

BMW's Hybrid Vision: Gasoline and Steam, Popular Science Magazine, Mar. 2006, p. 22 (one page).

An Assessment of the Technology of Rankine Engines for Automobiles. Div. of Transportation Energy Conservation, U.S. Energy Research & Develop. Admin., Apr. 1977, pp. 43-54.

* cited by examiner

HIGH EFFICIENCY MULTICYCLE INTERNAL COMBUSTION ENGINE WITH WASTE HEAT RECOVERY

This application is a continuation-in-part of Ser. No. 12/492,773 filed Jun. 26, 2009. The applicant claims the benefit of the following provisional and non-provisional applications entitled INTERNAL COMBUSTION ENGINE WITH AUXILIARY STEAM POWER RECOVERED FROM WASTE HEAT, Ser. No. 12/387,113 filed Apr. 28, 2009; Ser. No. 60/905,732 filed Mar. 7, 2007; Ser. No. 12/075,042 filed Mar. 7, 2008 (U.S. Pat. Pub. No. 2008/0216480A1); Ser. No. 61/192,254 filed Sep. 17, 2008, Ser. No. 61/194,608 filed Sep. 29, 2008 and Ser. No. 12/492,773 filed Jun. 26, 2009 which are incorporated herein by reference.

FIELD OF THE INVENTION

This invention relates to internal combustion engines with supplemental steam power obtained from waste combustion heat and to a combination internal combustion (I.C.) engine and steam engine.

BACKGROUND

Internal combustion piston engines although highly developed, dependable and relied upon for almost all road transportation throughout the world generally lose about 72-75% of the fuel heating value through radiation, engine coolant and exhaust. The measured brake horsepower of a typical six-cylinder spark ignition automobile was only 21% of the fuel heating value at 72 MPH and only 18% at 43 MPH, *Internal Combustion Engine Fundamentals*, J. B. Heywood, McGraw Hill 1988 pg. 675. Meanwhile, increasing fuel prices and shortages mount steadily as world supplies of fossil fuel decline and greenhouse gas emissions continue to rise. While there have been several attempts to provide greater efficiency in an internal combustion engine by recovering energy from waste heat, prior proposals have had marked shortcomings. One prior system developed by BMW International (U.S. Pat. No. 6,834,503) requires, in addition to the internal combustion engine, an entirely separate steam expander that is connected to the internal combustion engine by a belt to recover power from engine coolant and an exhaust powered steam generator. This arrangement adds considerably to the size, weight and expense of the power plant as well as placing limitations on thermal recovery. Because of space constraints in a vehicle, the volume and weight of the complete unit is critical. Porsche AG developed a waste heat turbine that was geared to an I.C. engine (U.S. Pat. No. 4,590,766).

The present invention aims to provide a way to recycle steam continuously in a closed circuit (no steam exhaust) through a high efficiency expander where economy of operation is the prime consideration while the same time improving I.C. emissions. Attempts have been made to combine a gas and steam engine for recovering waste engine heat, examples of which are the Still engine (GB Patent Nos. 25,356 of 1910 and 28,472 of 1912 and U.S. Pat. No. 1,324,183) and Mason U.S. Pat. No. 3,921,404. Still has a cylinder cover below the piston that provides a thin annular chamber which allows steam to flow in and out between the cover and the piston from an opening in the cylinder wall. In a counterflow engine, steam pressure throughout the entire cylinder falls close to atmospheric during the entire exhaust stroke producing a drop in steam temperature which cools cylinder walls allowing condensation of the steam admitted on the next power stroke. This robs the engine of power that would otherwise be available by reducing the mean effective cylinder pressure of the incoming charge of steam. However, the efficiency of steam engines operating on what is known as the uniflow principle achieve much greater efficiency than in a counterflow steam engine by reducing the condensation of steam. The inventor of a steam-only uniflow engine described in U.S. Pat. Nos. 2,402,699 and 2,943,608 reported tests showing a thermal efficiency of 38.2% at 3450 RPM. A double acting hollow piston uniflow engine is described in *Marks Standard handbook for Mechanical Engineers*, 1987 Section 9-37 as the "last great improvement in design" but it is unsuited for use as a combination internal combustion and steam engine for a car in part due to overheating of the piston.

One object of the present invention is to provide a combined internal combustion and steam engine that overcomes thermal inefficiencies inherent in prior combination engines but has the advantage of utilizing I.C. components (piston, cylinder, connecting rod and crankshaft) and efficiency gains that result from sharing some of the I.C. mechanical losses as well as having a compact unobstructed combustion chamber without pockets or extensions as present in an F head (opposing valve) engine thereby permitting a high performance, high compression four I.C. valve hemispherical chamber construction. A more specific object is to provide a combination engine in which internal combustion and steam act on the same piston without steam condensing on the cylinder or piston walls or heads upon admission so as to eliminate condensation losses previously inherent in prior double acting combination engines. To accomplish this, the invention must provide an I.C. steam engine with protection against losses inherent in filling the clearance space or those due to chilling of steam chamber walls by low-pressure exhausted steam as good as or better than in what is known as a uniflow engine. An important requirement in a double acting I.C. and steam engine is the need for a mechanism that uses the least possible added cylinder length to minimize engine size and weight. However, it is also necessary to prevent burnt I.C. gas/oil and blow-by gas from contaminating the steam and thereby reducing steam generator and condenser efficiency. Another general objective of the present invention is to provide a power source for more efficiently utilizing waste heat that is built into the internal combustion engine itself so that a separate steam engine or expander is unnecessary, making possible better recovery of waste energy from the internal combustion engine as well as a reduction in the over-all volume of the power unit and its production cost together with improved operating flexibility so that the engine is well adapted for powering vehicles especially cars, buses, trucks, locomotives or aircraft. It is a more specific object of the present invention to obtain the outstanding efficiency advantages of a combustion piston having an adjacent steam chamber that is able to provide both an effective zero steam chamber clearance and a gain in mean cycle temperature. Another object is to make possible reliable steam admission timing while providing variable steam cutoff in an engine that derives power from steam and combustion acting upon a piston yet is flexible enough to operate efficiently with large variations in load and steam generator output. Yet another object is to more efficiently recover lost combustion heat by conductive transfer to a working fluid within the engine itself as well as a more efficient way of recovering waste heat from I.C. engine coolant and from engine exhaust gases. Still another object is to find a way to accurately vary steam cutoff in an internal combustion-steam hybrid engine while being able to recompress residual steam to throttle pressure within a combustion piston. A further more specific object is to provide a multicycle engine in which steam acts on an internal combustion piston without the requirement for a piston rod, rod seal or crosshead while at the same time reducing the length of the cylinder.

These and other more detailed and specific objects and advantages of the present invention will be better understood by reference to the following figures and detailed description which illustrate by way of example but a few of the various forms of the invention within the scope of the appended claims. Topic headings are for convenience of the reader and not to be considered in any way limiting.

BRIEF DESCRIPTION OF THE DRAWINGS

FIG. 1A is a partial sectional view taken through an end of the wrist pin 26 of FIG. 1 to show an alternate pin mount.

SUMMARY OF THE INVENTION

Figure 1:
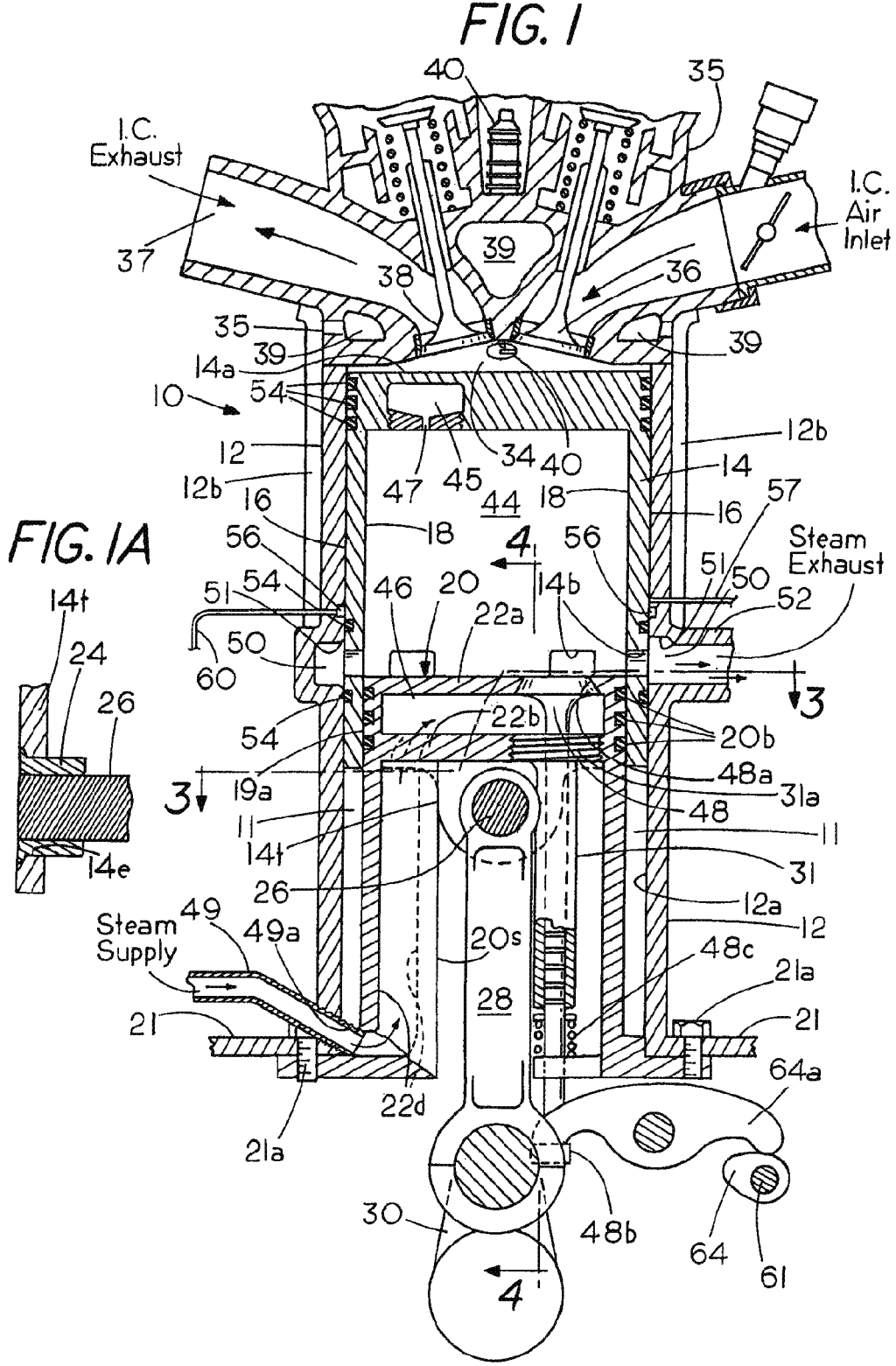
FIG. 1 is a semi-diagrammatic vertical sectional view of one cylinder of an engine in accordance with the invention showing the piston at the top dead center position.

This invention concerns a high efficiency composite internal combustion and steam engine especially suited for use in cars and trucks which includes a combustion chamber for burning fuel to power a piston by combustion as well as at least one expandable chamber within the engine that is powered by steam generated from what would have been waste heat from the combustion chamber. Previous systems for recovering waste exhaust heat and waste heat from the combustion chamber coolant in a dual cycle engine have been inefficient. To overcome this and other deficiencies, the present invention provides a combined cycle engine which employs the advantage of using high temperature, i.e., superheated steam with a way of accomplishing uniflow steam operation inwardly of each internal combustion piston to improve operating efficiency as well as benefiting from a way to provide variable steam cutoff through the use of one valve or a pair of series connected, inwardly retractable, steam pressure balanced valves that are located in a cylinder cap which is sealed within each piston operating in cooperation with steam recompression and a provision for achieving effective clearance volume changes that vary with engine speed to thereby further increase efficiency and the specific power output from the waste heat energy recovered. In one example of a cutoff control, a camshaft is coupled for changing the phase of a single valve or a pair of steam admission valves in which the overlap is varied, thus providing continuous regulation of the steam cutoff to further reduce specific fuel consumption. These objectives are accomplished while combustion and steam act on opposite sides of each piston, yet, without the need for a piston rod, rod seal, crosshead or guide through the provision of a coupling between the piston and connecting rod that is positioned inward of the steam cylinder head or cap so as to reciprocate within an opening extending along the axis of the cylinder between the outer end of the cylinder cap and the crankshaft.

Depending upon the application of the engine, the cylinder cap which is placed adjacent to a steam exhaust port can be unheated, but if advantageous, is capable of being heated to the temperature of the superheated steam supply or, if desired, is able to provide an intermediate controlled degree of heating to minimize potential power losses. Heating of the cylinder cap makes it possible in some engine applications to achieve high efficiencies which surpass those in what is known as a uniflow steam engine so as to provide additional power from waste combustion heat; an efficiency level that is much higher than in an ordinary counterflow steam engine. The engine also has the flexibility needed under non-uniform steam generator pressure and engine load conditions that occur in vehicles through a provision for variable steam displacement. Another aspect of the invention concerns a more efficient way to recover combustion heat that is contained in the combustion chamber coolant and in the I.C. exhaust gas using an exhaust powered superheater comprising an engine exhaust manifold for supplemental combustion of unburned fuel while also providing for the direct conduction of the heat produced in the combustion chamber to increase the enthalpy of expanding steam within the steam expansion chamber inside of each piston. Engine coolant can be evaporated in the engine-cooling jacket to form steam which is then superheated by I.C. exhaust gases within an engine exhaust manifold for powering the steam expansion chamber within each piston. The invention thus provides an improved heat recovery, heat exchange, steam generator and superheater system for generating steam with a way to better construct a steam expansion chamber, steam cylinder head, valving and heated steam exhaust area. There is also a provision for steam recompression to admission pressure inside of a combustion piston so as to achieve an effective zero clearance volume and a gain in mean Rankine cycle temperature along with a steam supply arrangement that is able to act on each piston within an I.C. engine so as to more effectively economize on fuel, make a more efficient combined gas and steam engine, balance the steam displacement with steam generator output to use steam more efficiently, and provide other features that will be apparent from the following description without the use of a piston rod, crosshead or crosshead guide thereby reducing the reciprocating mass.

DETAILED DESCRIPTION OF THE PREFERRED EMBODIMENTS

Figure 2:
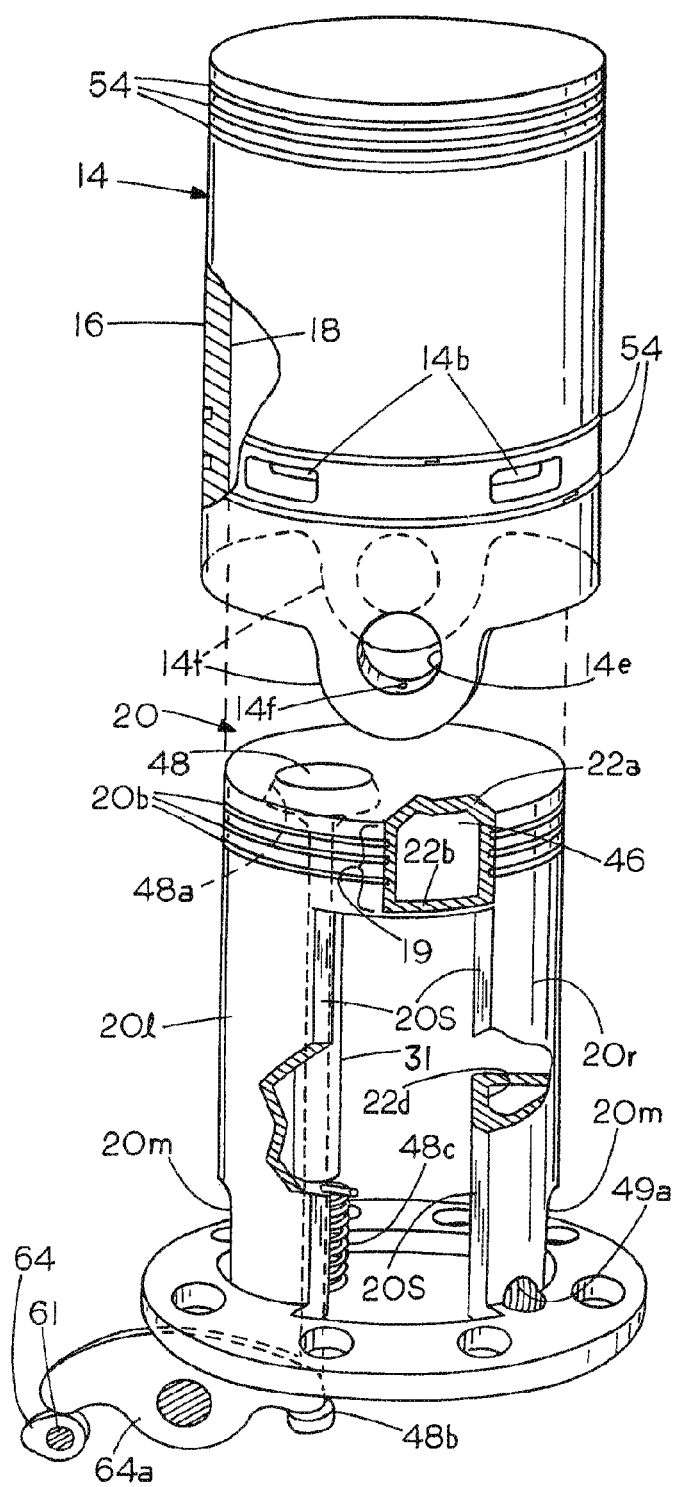
FIG. 2 is an exploded perspective view of the steam cylinder head or cap and piston.

Refer now to the drawings in which the same numbers refer to corresponding parts in several views. Shown diagrammatically in FIGS. 1-7 is a combination internal combustion engine and steam engine 10 that has a cylinder 12 containing a cup shaped trunk style piston 14 which, unlike ordinary pistons, is machined and ground to precise tolerances both outside at 16 as well as in the inside at 18 and is positioned to reciprocate within an annular space 11 between the inside wall 12a of the cylinder 12 and a stationary steam cylinder head. The piston 14 is provided with two compression rings and at the bottom an oil ring all marked 54. Near the lower end of the piston are circumferentially arranged exhaust openings 14b in the piston skirt. Positioned above and below the exhaust openings 14b are additional compression rings 54 (FIGS. 1 and 2). While a single cylinder and piston is shown for convenience in some views, the invention is of course applicable to multi-cylinder engines as well. Any suitable working fluid such as water or water mixed with another fluid such as ethyleneglycol or other known working fluid can be used.

Figure 2A:
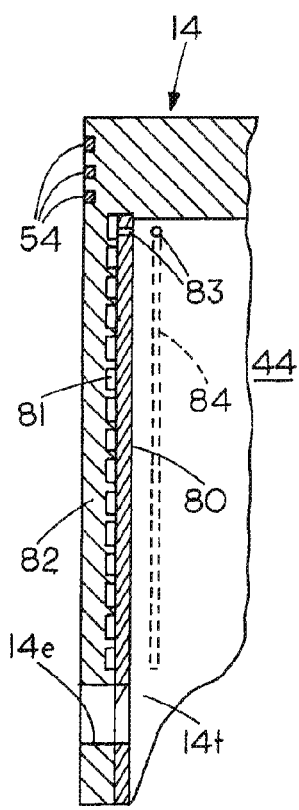
FIG. 2A is a partial vertical sectional view of the piston of FIG. 2 taken through the center of one of the tongues 14t to show an optional modified form of piston wall.

The steam cylinder head (FIGS. 1-7) which is located within the piston 14 comprises a flat hub, disk or circular cap 20 having a top wall that may be, say, ¼ to ½ inch in thickness supported at the free upper end of a pair of integral axially extending laterally spaced arcuate (preferably semicircular) left and right legs 20l and 20r connected to a circular flange that is secured to the crankcase 21 by bolts 21a. The disk or cap 20 acts as a lower or inner steam cylinder head or end cap comprising one end of a steam chamber 44 and has at its outer edge a cylindrical surface 19a as a part of a downwardly extending collar 19 that is dimensioned to provide a sliding fit within the piston 14 and is grooved to support compression rings 20b which provide a sliding seal with the inner cylindrical surface of the piston 14. It can be seen that the cap 20 traverses the cylinder 12 at an intermediate location that is spaced from its ends. The alloys used in the piston 14 and cap 20, are selected to provide a predetermined balanced amount of expansion during startup. When an aluminum piston is used, the interior wall 18 can be electroplated with porous chromium by a well-known method or covered by a steel sleeve (FIG. 2A) to provide a hard piston ring contact surface.

Figure 3:
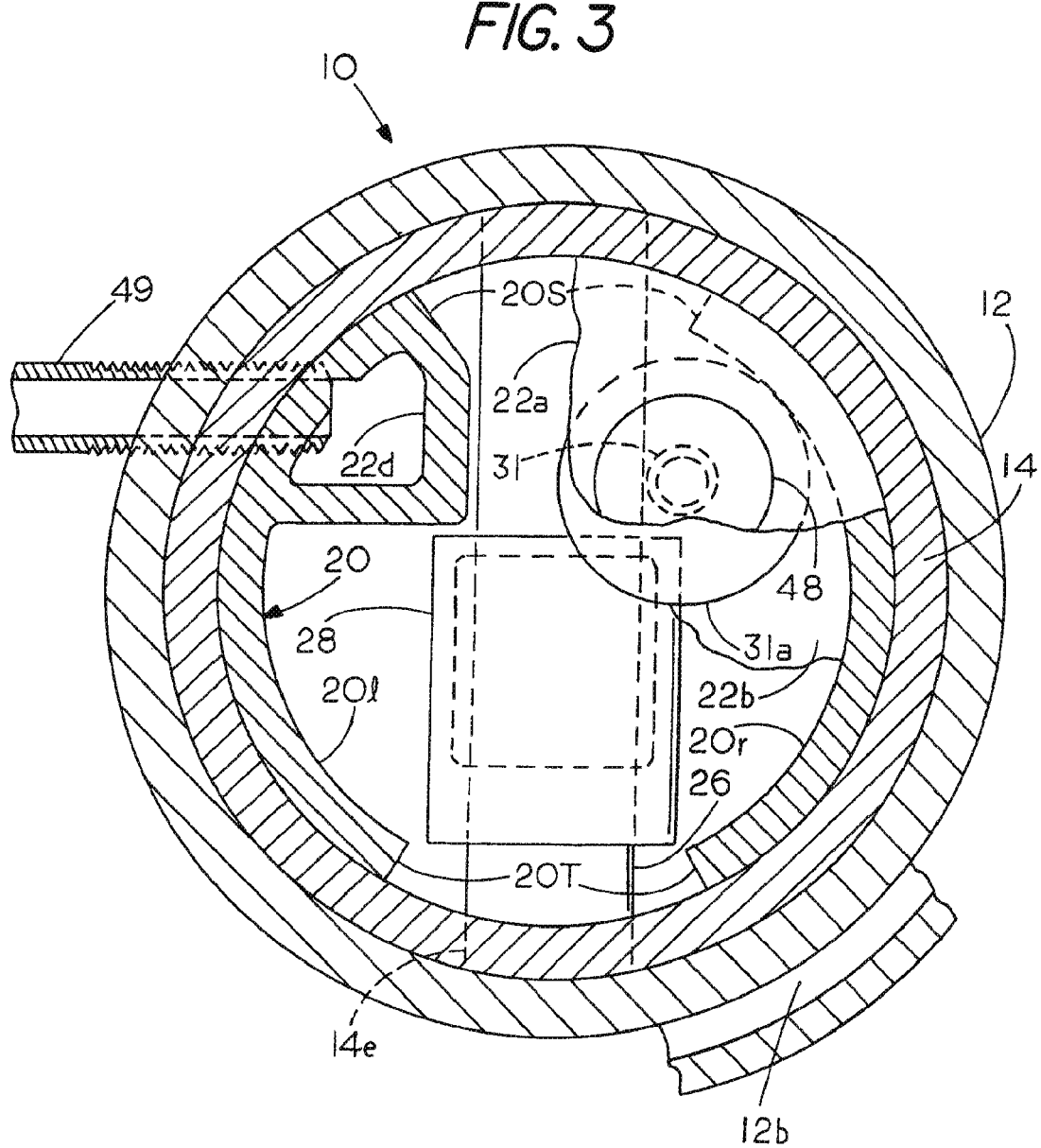
FIG. 3 is a horizontal, cross-sectional view taken online 3-3 of FIG. 1.
Figure 4:
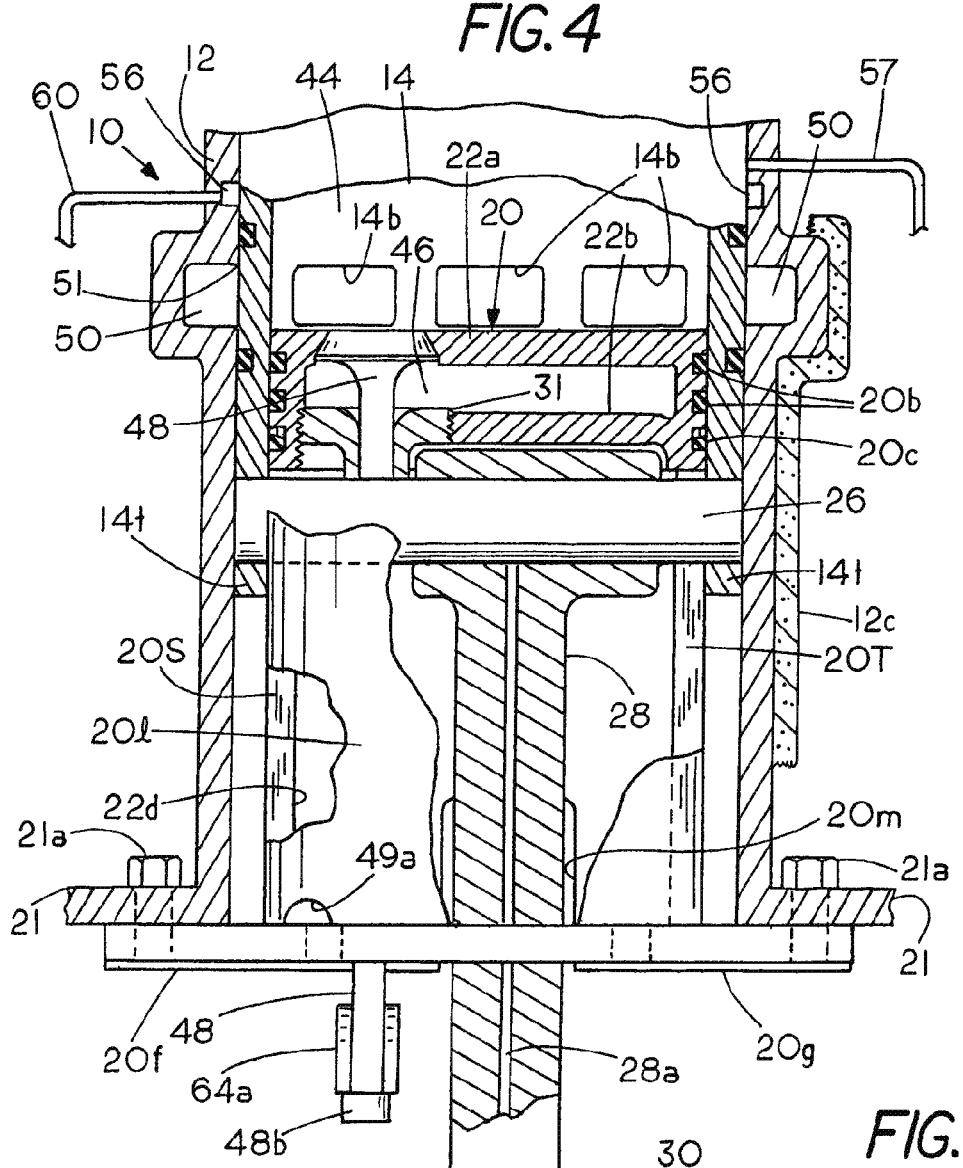
FIG. 4 is a partial vertical sectional view taken online 4-4 of FIG. 1 with the lower cylinder head assembly or cylinder cap shown partly in side elevation.

Between the legs 20l and 20r on each side are axially extending opposed slots 20s and 20t (FIG. 4) that provide an opening which traverses the cylinder 12 between the cylinder cap 20 and crankshaft 30. In the present invention there is no piston rod, rod seal, crosshead or crosshead guide. Instead, to reduce the number of parts as well as the reciprocating mass and the length of the cylinders, there is provided on each side of the lower end of the piston 14 pair of opposed inwardly extending (toward the crankshaft) tongues 14t bored to hold the ends of a transversely extending wrist pin 26 (FIGS. 1 and 3). The ends of the wrist pin 26 can be held in the bored openings 14e in each tongue by a pin for example extending through an opening 14f (FIG. 2) or a boss 24 can be press fitted through each tongue during assembly to hold the wrist pin 26 (FIG. 1A). Pivotally supported on the wrist pin 26 is the upper end of a connecting rod 28 (FIGS. 1, 3 and 4). Thus the openings 14e serve to support the ends of the wrist pin which at t.d.c. is located just below the top of the cylinder cap 20 for coupling the connecting rod 28 to the piston 14. It is preferred to have the connecting rod 28 offset toward one end of the wrist pin 26 as in a Lancia engine and other engines to make possible the placement of a steam admission valve 48 and valve guide 31 closer to the center of the piston (FIGS. 3 & 4).

Due to the presence of the inner cylinder cap 20, the piston cannot be secured to the connecting rod before insertion into the cylinder. Instead, the piston is placed on the cap 20 in the b.d.c. position, the wrist pin then inserted through the openings 14e as well as through the bearing at the upper end of the connecting rod 28. The cap 20 and piston can then be elevated into cylinder 12 and secured by the bolts 21a to the crankcase 21 before attaching the big end of the connecting rod 28 to the crankshaft 30 as the wrist pin is slid upwardly through the slots 20s and 20t between the legs 20l and 20r. If desired, the flange at the lower end of the legs can be omitted and the lower end of the legs provided with screw threads so that the bottom end of the cylinder cap 20 can be threaded into the cylinder 12 instead of being bolted to it.

An alternate form of piston (not shown) has a separate lower cylindrical threaded segment just below the openings 14b that is screw threaded onto the skirt during assembly. The lower segment has the tongues 14t with aligned centrally extending integral bosses for the wrist pin similar to the bosses of an ordinary piston.

The steam admission valve 48 is an inwardly retractable poppet valve that seals the steam expansion chamber 44 by contact with a conical valve seat 48a (FIG. 5) adjacent a port in an upper wall 22a of the cylinder cap 20 (FIGS. 1 and 2). The cap 20 also has a lower wall 22b defining a chamber 46 which serves as a steam chest that is supplied with steam through a passage 22d as a part of the leg 20l. Steam is supplied at throttle pressure to the passage 22d through a pipe 49 that is threaded into an opening 49a in the bottom of the leg 20r. The valve 48 is slidably mounted in a central bore of a valve guide 31 which has an enlarged head threaded at 31a into a lower wall 22b of the steam chest 46. Attached to the lower end of the valve stem of valve 48 is a stop 48b in contact with one end of a valve rocker 64a that is operated in timed relationship with the rotation of a crankshaft 30 and cam 64 on a cam shaft 61 that can be advanced or retarded for controlling the steam admission and cutoff as described in copending application Ser. No. 12/075,042 and Ser. No. 12/387,113 which are incorporated herein by reference. When advantageous in a particular design, the lower end of the legs 20l and 20r can each be provided with a slot or pocket 20m (FIGS. 2 and 4) to act as recesses if needed to prevent the connecting rod from contact with the side wall.

It will be seen in FIG. 2 that the steam chest 46 will keep the upper wall 22a of the cylinder cap 20 heated during operation so as to prevent the condensation losses due to chilling of steam entering the steam expansion chamber 44 for avoiding a drop in mean effective steam pressure within the cylinder which is most likely to occur during startup or when the engine is run intermittently. The engine can be run with a dry sump to keep oil away from the piston exhaust openings 14b which are placed in alignment with legs 20l and 20r and not with slots 20s and 20t. Lubrication is supplied conventionally by force feeding from a passage in the crankshaft 30 through the connecting rod at 28a (FIG. 4) and through oil supply lines 57 to the cylinders. Excess oil and blow-by combustion products are stripped off the piston through a channel 56 and return duct 60 as described in pending application Ser. No. 12/075,042 which is incorporated herein by reference.

It can be seen that approximately the lower half of the piston is exposed to ambient temperatures when below rings 20b. Heat transfer from the piston skirt to the cylinder wall 12 is minimized by a thermal insulating layer 12c (only part of which is shown) covering the entire outside of the engine. Convection losses to air inside the piston below the steam chest 46 are reduced by a pair of semi-circular sheet metal baffle plates 20f & 20g extending horizontally across the lower end of the cylinder cap assembly with a gap between them that is wide enough for the connecting rod to pass through (FIG. 4). The lower part of the piston will equilibrate to a temperature intermediate ambient and the mean temperature of the ring or collar area 19 and inside the cylinder. Because the top third of the piston is never exposed to ambient temperatures and the bottom third is not raised into the steam expansion chamber 44, only the center third is able to materially affect condensation losses. Assuming the engine interior is at about 180° F. following warm up, there should be no condensation loss if the steam admission temperature is at least about 350° F. Heating steam to 350° F. can be accomplished without difficulty since combustion exhaust gases are usually in the range of about 750° F. to 1150° F. but can be as high as 1650° F. The temperature of the piston skirt will also be raised during operation due to the heat conducted from the ring area or collar 19 of the cap which is always the throttle temperature. In any engine where condensation losses can occur due to reduced piston skirt temperatures, each piston is internally sleeved (FIG. 2A) with a liner sleeve 80 that is bonded inside the piston with one or more internal heating chambers 81 between it and the outer piston wall 82, each connected by a small metering port 83 to the steam chamber 44 near the piston crown so as to hold steam during operation for heating the skirt of the piston from the inside while also serving as an auxiliary clearance volume chamber. The ports 83 function in the same way as metering duct 47 to be described below. The piston can be ribbed internally and longitudinal grooves 84 are provided in the outward surface of the sleeve 80 to carry steam throughout the piston skirt.

Figure 4A:
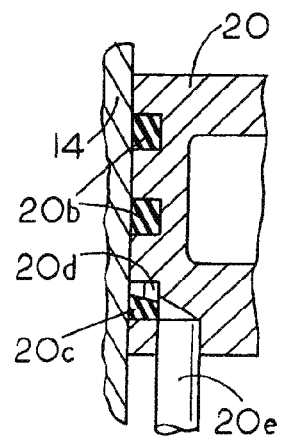
FIG. 4A is a partial vertical crossectional view of the cylinder cap on a larger scale to show blow-by steam collection.

FIGS. 4 and 4A show a cylinder cap 20 with a groove containing a steam collection ring 20c with upwardly opening circumferentially spaced radial slots 20d that serve as passages to carry any blow-by steam through a transfer duct 20e that is at atmospheric pressure to the condenser to capture escaping steam before it can be released into the engine.

Figure 5:
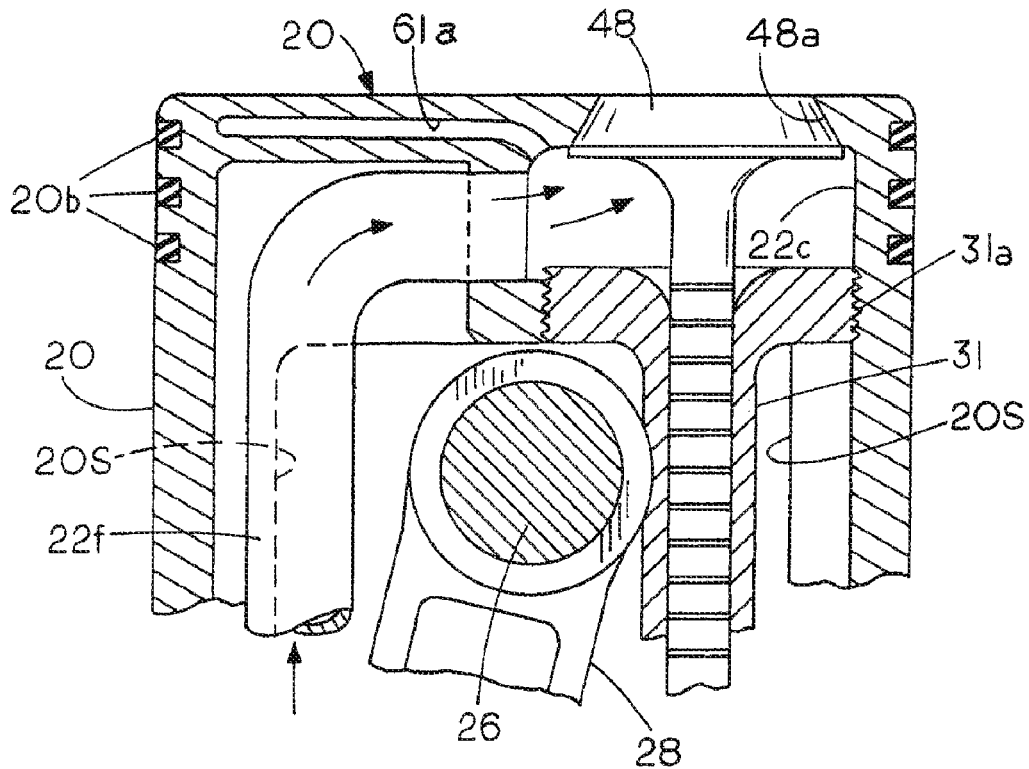
FIG. 5 is a vertical sectional view of a modified form of lower cylinder head assembly or cap to show how steam can be supplied directly to the steam admission valve through a supply pipe.

Refer now to FIG. 5 wherein the same numerals refer to corresponding parts already described which shows an alternate form of cylinder cap 20 in accordance with the invention that does not have a steam chest 46 but instead has a small chamber 22c only in one portion of the cylinder cap below the head of valve 48. In this embodiment, instead of a passage 22d that is part of the leg 201, steam at throttle pressure is admitted from supply pipe 49 through a pipe 22f to the chamber 22c located below the head of valve 48 so that each time the valve 48 is retracted inwardly, the steam is admitted to the steam chamber 44 via supply pipe 22f and chamber 22c. Consequently, there is substantially no heating of the upper wall 22a of the cylinder cap 20 as in FIGS. 1-4 but only incidental heating of the upper wall 22a of the cylinder cap from high pressure steam in the chamber 22c. The steam from the steam supply provided through pipe 22f is thus kept out of heat transfer relationship with parts of the cylinder cap other than at the inlet valve. In this way, overheating is avoided in an installation in which the engine 10 is run continuously as a battery charging module at a relatively high RPM so that heating of the cylinder cap upper wall 22a could produce a loss in efficiency due to excessive heat being carried away as the steam is exhausted from the steam chamber 44. The chamber 22c can be any size, with or without small steam ducts 61a if needed as described in copending application Ser. No. 12/387,113 extending from it in the upper wall 22a to thereby control heating of the cap 20 to any desired temperature that is required to prevent condensation losses on the cap 20, yet without enough heat flux for permitting excessive heat to be carried away from the cap as the steam is exhausted. Controlled heating can thus be accomplished by providing the top wall 22a with reduced heat flux e.g., by supplying less heat than that furnished by heating the full area of the cap as in FIGS. 1-4.

Figure 6:
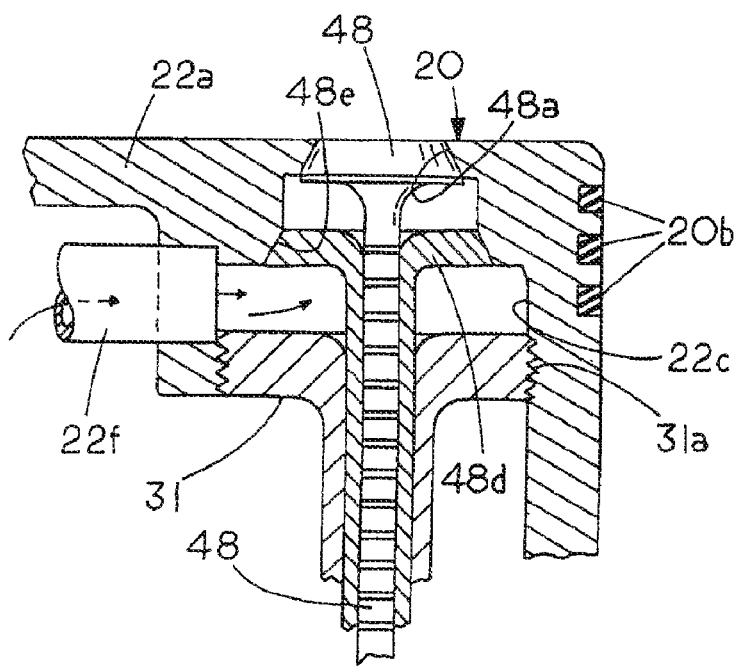
FIG. 6 is a vertical sectional view similar to FIG. 5 showing optional concentric steam admission valves according to the invention and FIG. 7 is a schematic diagram of one form of engine installation assembly and engine control.

Refer now to FIG. 6 which illustrates another form of the invention in which a pair of series related valves take the place of a single valve 48. In FIG. 6 wherein the same numerals refer to corresponding parts already described, the valve 48 passes through a central bored opening within a second valve 48d that is concentric with valve 48 and has a head that forms a seal on conical valve seat 48e. During operation of FIG. 6, the valves 48 and 48d are operated in sequential timed relationship to precisely control the cutoff of the steam mass admitted during each cycle with a provision for changing the phase of the valves to vary the cutoff continuously from, say, 5% to 50% of the power stroke as determined by an engine controller 305 (FIG. 7) more fully described in copending U.S. application Ser. No. 12/387,113 which is incorporated herein by reference. Steam at throttle pressure is supplied through the pipe 22f to the chamber 22c as described in connection with FIG. 5. Thus, the phase of the camshaft for valve 48d is advanced or retarded with respect to valve 48 to thereby regulate the cutoff of steam through the sequential operation of valves which together permit the admission of steam through an intervalve passage into the steam expansion chamber 44 during the interval that both admission valves 48 and 48d are open. This enables the steam cutoff to be varied throughout operation as determined by an electronic engine management controller 305 (FIG. 7) through variable cam positioning, namely by providing a separate cam shaft for each valve with valve timing control for changing the phase angle of valve 48d relative to valve 48 (FIG. 6) to control the overlap of the valves. The valves 48 & 48d need not be concentric but can be separate valves connected in series as described in Ser. No. 12/387,113 filed Apr. 28, 2009. Concentric valves, however, provide the advantage of minimizing the size of the intervalve passage thereby assuring better control of the volume of steam admitted, especially at a short cutoff as well as providing a straight intervalve passage. It will be seen that in both FIGS. 5 and 6, because heat is supplied from the pipe 22f only to the chamber 22c in one portion of the cylinder cap, heat flux to the cylinder cap is less than that produced by jacketing the entire cylinder cap 20 with steam from the steam chest as shown in FIGS. 1 and 2. The valves 48 and 48d are biased upwardly to their seated position on a valve seat, each by a spring such as spring 48c. Valve 48 as well as valve 48d can function as pressure relief valves on the down stroke of the piston when pressure in chamber 44 exceeds that in 46.

FIG. 1 shows a conventional internal combustion chamber 34 above the upper face 14a of the piston 14 enclosed at the top of the cylinder by a cylinder head 35 which has an inlet valve 36, an exhaust valve 38 and port 37, chambers 39 for coolant circulation, and a spark plug 40 operating as a four stroke (Otto) cycle I.C. engine that burns gasoline or other fuel in the combustion chamber 34 but which can be a diesel engine or a two stroke cycle engine, Atkinson or other cycle if desired. The combustion chamber 34 is cooled by a coolant at 39 in the head that is also circulated through a water jacket 12b (FIGS. 1 and 7) of the cylinder 12. It can be seen that the combustion chamber 34 is compact, unobstructed, has no side pockets and, if desired, can even be of high performance, high compression, four overhead I.C. valve hemispherical construction to avoid detonation.

Within the wall of the cylinder 12 and extending around it nearly in alignment but slightly above the top of cap 20 is a steam exhaust manifold 50 which communicates with the interior of the cylinder 12 through several circumferentially spaced steam exhaust ports 51. It can be seen in FIG. 2 that the steam inlet valve 48 and steam exhaust ports 51 are located in approximate lateral alignment but the exhaust ports are outward of the cap 20 at a slightly higher elevation. In operation, exhaust gas expelled through the exhaust port 37 of the I.C. engine passes through a steam generator to be described below which recovers waste heat by boiling water or by superheating steam produced in a jacket 12b (FIG. 1) which is then supplied to the engine. Exhaust steam escapes through the steam exhaust manifold 50 to low-pressure steam return line 52 when the piston reaches the top dead center position as the exhaust openings 14b in the piston skirt become aligned (FIG. 1) with ports 51 to act as an automatic exhaust valve, thus, in effect, providing a self-contained steam engine below each piston 14 of the I.C. engine. It will be noted that the automatic exhaust valve opens and closes while the steam chamber 44 is in an expanded state. As the exhaust valve opens, any moisture on wall 22a will be swept forcefully out of the cylinder thereby avoiding condensation losses that may otherwise be caused by residual moisture on or around the top of the cap 20. Exhaust steam is condensed, then reheated and continuously recirculated back to the steam expansion chamber 44 in a sealed circuit that is separate from the I.C. engine intake and exhaust gas thus the water or other working fluid seldom requires replacement.

It can be seen that the cap 20 serves as the lower (steam) cylinder head for the steam expansion chamber 44, seals the chamber, provides support for the steam inlet valve 48 and establishes the clearance volume of steam chamber 44 which is purposely kept small to insure efficient operation. It is important to note that since both the inside top wall of the piston and top wall of the cap have the same shape (here a flat plane), the clearance volume can be made as small as desired. The arrangement of chamber 44, cap 20, steam chest 46, and piston 14 as shown makes it possible for the entire lower end of the steam expansion chamber 44 to be steam jacketed including the steam inlet valve 48 and the top surface of the cap 20 which may therefore, when desired, be kept close to the elevated temperature of the steam chest 46, e.g., 1000 P.S.I. at 850° F. thereby preventing loss of power due to chilling or steam condensation on those parts within chamber 44. It will be noted that the exhaust ports 51 unlike uniflow ports of an ordinary steam engine are located on the cylinder wall adjacent to a heated engine surface, namely, the cylinder cap 20, all of which can be heated externally throughout operation when advantageous by the steam chest 46. Low-pressure steam is thus exhausted through line 52 (FIG. 1) when chamber 44 is fully expanded. After port 51 closes, throughout substantially the remaining inward stroke of the piston, residual low-pressure steam is recompressed to reach admission pressure.

The construction shown in FIGS. 1-4 produces a marked improvement in operating efficiency compared to a conventional counterflow engine. For example, assuming a 800 P.S.I. throttle pressure and a 10% cutoff, the uniflow steam rate of the engine described and shown in FIGS. 1-7 is calculated to be 8.2 lb./HP-Hr, while in an equivalent counterflow engine the steam rate is calculated to be 11 lb./HP-Hr so that the invention is able to make possible a 25% improvement. At a 12.5% cutoff, the engine of FIGS. 1-7 is calculated to have a steam rate of 8.3 lb./HP-Hr. vs. 10.4 for a conventional counterflow engine (a 20% improvement).

The piston, steam exhaust valve and cap 20 are constructed to enable the inward stroke to bring residual steam up to the admission pressure. This produces an effective zero clearance in chamber 44 so that the entire steam mass as it enters is totally consumed by admission and expansion work and is therefore more efficiently utilized while at the same time achieving a gain in mean cycle temperature. Efficiency can be better than a uniflow steam engine because unlike the uniflow engine, where the piston surface adjacent the exhaust valve cannot be heated, here, if desired, the entire adjacent cap 20 (FIGS. 1 and 2) above high-pressure steam chest 46 can be externally steam jacketed and thus heated continuously when it is advantageous by the steam chest 46 so as to prevent chilling the incoming charge of steam which is most likely during start-up or intermittent operation. It is of importance to note that the invention enables low-pressure steam exhausted through ports 51 and line 52 to be kept away from the heated area below cap 20. Any oil or condensate in the steam chest can be removed through a drain (not shown).

Steam Exhaust

During operation, when the exhaust ports are uncovered by the piston openings 14b acting as an exhaust valve, any moisture on the top of the cap 20 is blown out of the cylinder in several directions rather than being left in it to be evaporated again during the following power stroke as is the case in a counterflow engine thereby eliminating condensation losses. As noted previously, on the down stroke, the remaining steam in the cylinder is recompressed in the clearance space to substantially admission pressure. A spring loaded steam relief or bypass valve (not shown) can be provided in the cap 20, if desired as described in copending application Ser. No. 12/387,113 to prevent excessive pressures in chamber 44 during start up or in case the condenser fails. From the steam exhaust manifold 50; the low-pressure steam passes through pipe 52 to a condenser, next to a steam generator where it is turned to steam, then through line 49 back to the high-pressure steam chest 46 and into the steam expansion chamber 44 through valve 48 thereby completing an endless circuit as it is continuously recycled throughout operation.

Engine Management Control

The engine management control is accomplished by means of a central engine management control 305 (FIG. 7) as described more fully in prior copending patent application Ser. No. 12/387,113 which is incorporated herein by reference for continuously regulating the various output devices including the IC engine throttle, the steam throttle T (FIG. 7) and the cutoff of steam to chamber 44 by means of valve 48, i.e., the point in the cycle at which valve 48 opens and closes or the overlap with valve 48d (FIG. 6) for determining the mass of steam admitted each cycle of operation in order to maximize the efficiency and reduce the specific fuel consumption of the engine under the operating condition being experienced.

Steam admission timing, cutoff control, and steam valve phasing is described in copending application Ser. No. 12/387,113 which is incorporated herein by reference. The camshaft 61 can be gear-driven, e.g., using known methods of variable valve timing for advancing or retarding the camshaft cam 64 thereby advancing or retarding the steam cutoff. Alternatively, each cam 64 of camshaft 61 can be an axially moveable three-dimensional cam contoured along its length to provide different cutoff at each position set by the computerized electronic motor control 305. Thus, the control 305 by sliding the camshaft 61 axially can select an optimum cutoff to provide the most efficient operation and the best gas mileage for a vehicle.

Steam Engine Efficiency and Avoidance of Enthalpy Losses

It can be seen that Rankine efficiency is enhanced by the direct conduction of heat from the burning gas in combustion chamber 34 through the top 14a of the piston to the steam under the piston. Of the fuel heating energy that is lost when the fuel is burned, about 8% is lost during combustion and about 6% during expansion. Much of this lost heat is transferred into the crown and upper part of the piston 14 and in turn to the steam in chamber 44 thereby increasing enthalpy of the steam and enhancing efficiency. The head of the piston can however be maintained at a safe operating temperature due to the large volume of steam passing through the chamber inside the combustion piston.

From the foregoing description it can be seen that the invention avoids evacuating low pressure steam throughout the entire stroke of the piston as in a counterflow engine that enables moisture to collect in the cylinder. It also avoids having a dead air space under the piston crown that would interfere with cooling the combustion chamber and it eliminates large cylindrical surfaces facing a narrow entry area in prior expanders that can condense steam entering the engine. In the present invention, steam flows out from the inside of a combustion piston during a short period of time when openings in the piston itself are aligned with a ring of cylinder exhaust ports. Recompression then takes place inside of a combustion piston on the opposite side of a wall heated by the hot combustion gasses. Moreover, the cylinder cap 20 can be heated throughout its entire area or to any desired degree thereby eliminating condensation losses that might otherwise occur without waste caused by excessive cylinder cap heat.

Communicating with steam chamber 44 through a metering duct 47 as shown in FIG. 1 is an auxiliary clearance volume chamber 45 within the piston crown. The duct 47 is chosen to regulate steam flow so as to provide a larger effective clearance volume at low RPMs but restrict flow increasingly at higher RPMs when less time is available during each cycle for chamber 45 to fill. The poor high frequency response of duct 47 thereby provides a smaller effective clearance volume so as to achieve maximum efficiency as described in copending application Ser. Nos. 12/075,042 and 12/387,113, which are incorporated herein by reference. Therefore, the effective clearance volume within the steam expansion chamber 44 is varied depending upon engine speed by the auxiliary clearance volume chamber 45 and metering duct 47 (FIG. 1) so that when the piston reaches the end of its inward stroke, the recompression pressure will be equal or almost equal to the throttle pressure in chamber 46 whatever its value. Thus, at the opening of the admission valve 48 (or in FIG. 6 valves 48 and 48a) at or near b.d.c., no steam flows into chamber 44 of the cylinder because the cylinder is already filled. Consequently, no steam mass is consumed just to fill the clearance volume. The result is an effective zero clearance. An instant later when steam does flow into the cylinder, its mass is totally consumed by admission and expansion work. Steam is therefore more efficiently utilized, thus improving efficiency of the engine. Also, as recompression occurs, the temperature of the recompressed steam will rise up to or above the admission supply temperature. The recompressed steam mixes with the supply steam admitted through the admission valve or valves resulting in a steam temperature at cutoff that is most preferably greater than the supply temperature thereby producing a gain in the mean cycle temperature and when the mean cycle temperature is elevated, the efficiency of the engine is enhanced. These two events of course occur at the expense of the work of recompression. However, thermodynamic analysis has shown that there is a net improvement in efficiency due to an effective zero clearance and an increase in the mean cycle temperature which produces an increase in output that is greater than the fraction of the recompression work that cannot be recovered during the expansion stroke. It can therefore be seen that the present invention is able to provide a dual cycle internal combustion steam engine having an effective zero clearance in the steam expansion chamber 44 as well as the capacity for achieving a mean cycle temperature gain thereby assuring a higher level of Rankine efficiency.

Superheater Assembly

Figure 7:
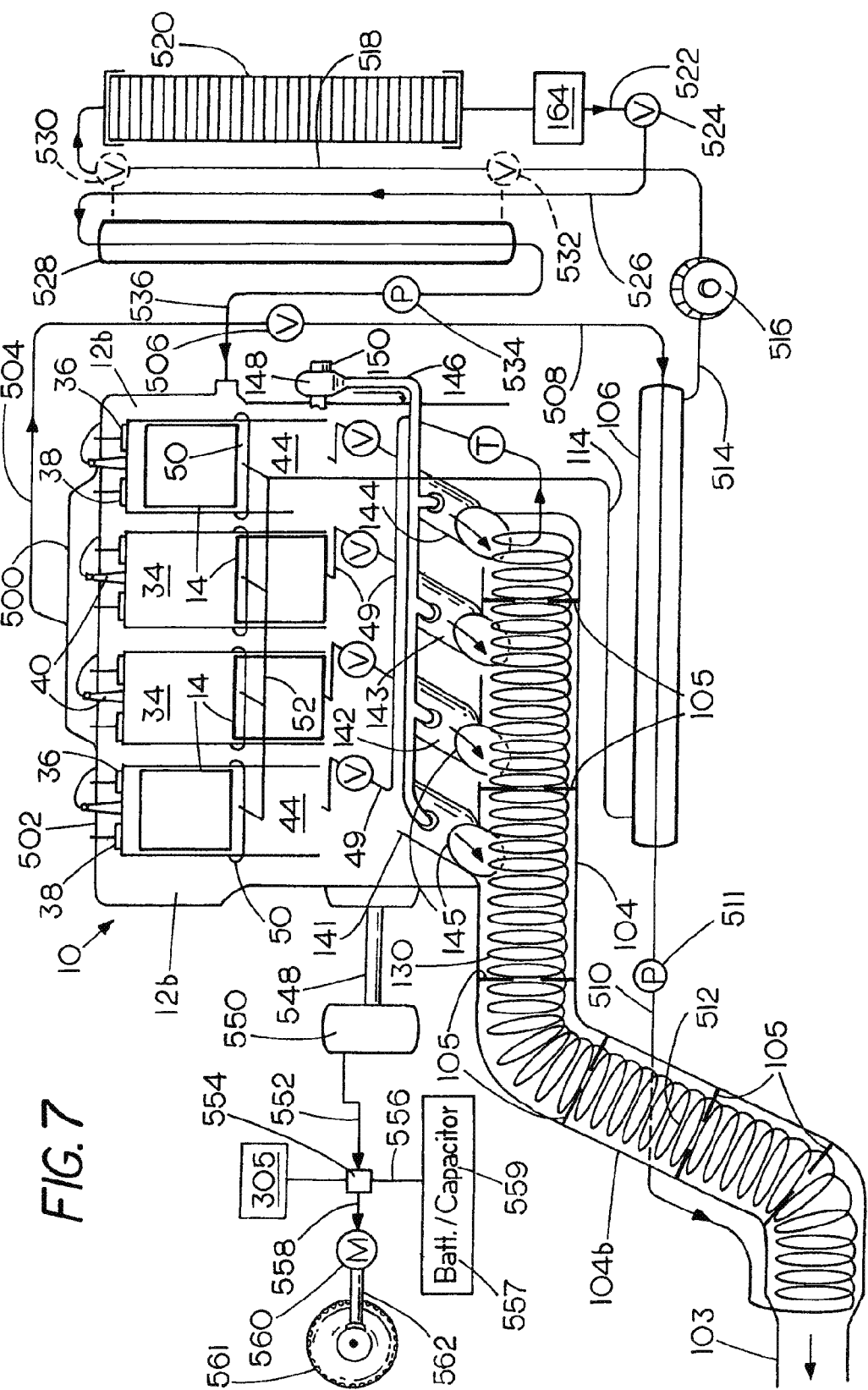

Refer now to FIG. 7. In accordance with the present invention, a superheater 104 is provided at the location of the exhaust manifold of a standard I.C engine. The superheater 104 which is somewhat larger than a standard exhaust manifold of an ordinary I.C. engine acts as an afterburner that forms part of an exhaust manifold for recovering additional waste energy while removing some pollutants, e.g., CO and hydrocarbons. Inside is a series of coils 130 of stainless steel tubing for superheating the steam produced in the steam generator assembly by heat transferred from the engine exhaust gases introduced into the superheater 104 through exhaust gas inlet pipes 141-144 which are themselves connected directly to the I.C. exhaust passages 37 in the cylinder head 35. Because the superheater 104 is between the steam generator and the cylinders and is connected in close proximity, e.g., 2-10 inches from the exhaust ports 37 by inlet pipes 141-144, the tubing coils 130 inside it are exposed to the greatest heat with steam flowing counter to the flow of exhaust gases. To maximize exhaust gas temperatures while also reducing pollutants, heated secondary air is injected into i.c. exhaust pipes 141-144 via injectors supplied with air from a blower 148 via air supply line 146. It can be seen that the coils 130 are exposed to both combustion products; those produced in the engine cylinder as well as those that result from the combustion of unburned gas that takes place within the superheater due to the injection of secondary air. The blower e.g. a positive displacement vane or roots blower 148 can be driven from the engine, by an electric motor 150 or by a small capacity exhaust gas or steam turbine (not shown) connected to line 114. Combustion exhaust gas entering the superheater 104 through the exhaust passages 141-144 can be as high as about 900° C. (1652° F.) but the most common range is about 400° C.-600° C. The auxiliary air supply introduced through the supplemental air supply line 146 will oxidize much of the unburned hydrocarbons and carbon monoxide present in the exhaust gas which may amount to as much as 9% of the heating value of the fuel. To optimize combustion and increase residence time, the superheater 104 is made much larger than a standard exhaust manifold, typically around 6-8 inches or more in diameter for a four-cylinder car engine. Optional swirl guides 105 with pitched radial blades give the gas a swirling action and increase residence time within the superheater 104 to enhance the combustion of unburned gas which is advantageous since it has been found that a 1.5% CO removal results in a 220° K temperature rise (Heywood Id. page 658). It will be seen that the superheater 104 is an afterburner that is made an integral part of the exhaust manifold itself where the I.C. exhaust gas at the highest temperature enters at several e.g. 4 points with combustion taking place therein where the monotube steam generator steam runs in a counterflow direction to incoming exhaust gas to thereby provide superheat at the highest temperature since the monotube steam generator line passes through the afterburner, entering furthest from the engine and leaving near the upstream end of the afterburner. It will also be noted that the steam flows from the steam generator into the superheater which receives upstream exhaust gases just as they exit the engine and while they are being further heated by the combustion of previously unburned hydrocarbons and other combustible gases resulting from the injection of hot air from the secondary air supply line 146. Consequently, the invention makes possible the recovery of heat from unburned gas and fuel which in an ordinary engine amounts to about 3-9% of the heating value of the fuel. Operation of the superheater is described more fully in copending application Ser. No. 12/387,113 filed Apr. 28, 2009 and Ser. No. 12/075,042 filed Mar. 7, 2008 which are incorporated herein by reference.

FIG. 7 shows a power plant installation especially useful as a battery charging module to extend the driving range of a hybrid I.C./electric vehicle but which could alternatively be connected mechanically to power the drive wheels as described above and in application Ser. No. 12/075,042 filed Mar. 7, 2008 and application Ser. No. 12/387,113 filed Apr. 28, 2009. For simplicity and clarity of illustration, the complete engine coolant circuit within the engine and the steam generator designated 100 in application Ser. No. 12/075,042 has not been shown in FIG. 7 but both can, if desired, be constructed as described therein. In FIG. 7 it will be seen that the engine 10 is connected mechanically by shaft 548 to an electric generator 550 which is wired at 552 to a power supply 554 that provides electric current to storage batteries 557 and/or ultracapacitors 559 through conductor 556 under the control of the electronic central engine management computer 305. Current from the power supply 554 can also be provided through conductor 558 to an electric motor generator 560 which is connected by shaft 562 to the drive wheels 561 of a vehicle such as an automobile, truck, locomotive, or propeller of an aircraft. Thus, during operation, the engine 10 is run at an optimum speed and load which is typically at a fixed RPM selected for recharging the ultracapacitor 559 and battery 557 when required and/or to provide electric power to the motor 560 which can be supplemented by power from the ultracapacitor 559 and/or battery 557 whenever additional power is needed. When the battery is charged above a set level, the engine 10 can be turned off by the motor controller 305 and the electric motor 560 then operated by the battery and/or ultracapacitor either separately or together. In such an installation, the vehicle is run initially on current from the battery 557 and/or ultracapacitor 559 while the engine 10 is used primarily as a back-up battery recharging device to increase the range of the vehicle.

FIG. 7 also illustrates how engine cooling and final steam production are integrated in series by circulating a single working fluid in a closed loop to serve as an engine coolant as well as the working fluid in the engine. Thus, the fluid which is heated first in the combustion chamber cooling jacket 12b surrounding the cylinders preferably to form steam by evaporative cooling flows out through pipe 504, then through a regenerator 106. To prevent the occurrence of hotspots in the combustion chamber due to runaway heating, water in the cooling jacket is agitated preferably by sonic vibration, by spray cooling or by connecting a pump to circulate coolant in a separate intrajacket circuit, i.e., by providing a constant laminar flow of coolant throughout the jacket 12b and 39 to maintain nucleate boiling. The steam produced then flows to the generator/superheater 104b-104 where it is heated further by combustion exhaust gas to provide superheated steam under high pressure that is supplied through the throttle T to the steam expansion chambers 44 of the engine 10 below the pistons 14. By running the combustion cooling chambers 39, 12b (FIG. 1) at a high enough temperature to evaporate the coolant within the cooling jacket 12a itself, steam collects at a controlled pressure above atmospheric pressure in the chamber 500 just above the combustion chambers 34. In operation, the steam flows out of chamber 500 through a steam duct 504 to a pressure regulator valve 506 which maintains a predetermined pressure within the engine 10. For example, at 25 psia, saturated steam produced in the engine will be at a temperature of 240° F. Once the steam has reached the predetermined pressure established by valve 506, it will then pass through supply line 508 to the countercurrent flow heat exchanger or regenerator 106 where low-pressure steam exhausted from the steam expansion chambers of the engine 10 through line 52 into line 114 enters the heat exchanger 106, flowing in the opposite direction thereby transferring a part of its heat load to the low temperature steam formed in the engine cooling jacket 39, 12b (FIG. 1). A bypass line (not shown) can also be connected between jacket 12b and line 508 to meter water to heater 104 under the control of CEM computer 305 whenever the flow of steam is insufficient.

Pressure in the steam generator and superheater 104 is maintained by a feed pump 511 in line 510. From the heat exchanger 106, the steam which has now been heated to a temperature approaching the temperature of exhausted steam, flows through pump 511 into the superheater 104 which has been extended by a pre-heater section 104b to a total length of about 6 feet or more and contains additional heater coils 130 that in the figures are depicted as a single spiral but which can consist of a total of 58 or more pancake coils 512, e.g., of 5/8" steel tubing connected end to end and spaced about 1¼ inches on centers. Each pancake coil 512 can be about 60 inches long to provide a total of about 290 feet of tubing (52 sq. ft. of heating surface) providing a 24 HP steam generator in which little power is lost due to backpressure. Superheated steam that is formed in the superheater 104 flows as described above through the throttle T, then through the high-pressure steam supply line 49 and valves V to the steam chest 46 then to the steam expansion chambers 44 to power the engine as described previously.

The low-pressure exhaust steam from the heat exchanger 106 after having transferred its heat load to the steam from the engine cooling jacket is pumped from line 514 by a compressor 516 through line 518 to a condenser 520 which is maintained by the compressor 516 at an elevated pressure substantially above atmospheric pressure so as to achieve a high rate of cooling in the condenser 520 owing to a substantial temperature difference between the ambient air passing through the condenser and the pressurized steam entering the condenser. Condensed steam collects at the bottom of the condenser 520 where it drains into a storage tank 164. The pressurized condensate in the storage tank 164 flows through a line 522 to a pressure regulator valve 524 which maintains the high pressure in the condenser 520 and in storage tank 164. From valve 524, condensate flows at a relatively low pressure through a feedwater line 526 to a countercurrent flow heat exchanger 528 where it can be preheated under certain operating conditions by diverting the flow from line 518 by valves 530 and 532 through the heat exchanger 528 when steam in line 518 is at a significantly higher temperature than the feedwater entering through line 526. From the heat exchanger 528, the feedwater is pumped by a feedwater pump 534 through line 536 back to the engine cooling jacket 12b to complete a closed circuit where it is again evaporated to form steam within the cooling jacket 12b and 39 of the engine 10. When evaporative cooling is used, much smaller pumps 511 and 534 are required than in an ordinary automobile cooling system since the flow rate required is only that needed to replace the water that is boiled away and 1 lb. of water which is boiled has about 30 times the cooling effect as in a standard cooling system.

All references cited above are considered to be disclosed as fully and completely as if reproduced herein in their entirety.

Many variations of the invention within the scope of the appended claims will be apparent to those skilled in the art once the principles described herein are understood.

What is claimed is:

1. A combination internal combustion steam engine comprising, at least one cylinder with a piston that is operatively connected to a crankshaft and is mounted for reciprocation in the cylinder between an outer combustion chamber and inner steam expansion chamber, a fixed cylinder cap sealingly and slidably mounted within the piston and having at least one steam admission valve therein, a steam exhaust valve communicating with the steam expansion chamber, a wrist pin connected to an outer end of a connecting rod and the wrist pin having ends connected to an inner end of the piston, the cylinder cap has at least one supporting member and an opening traverses the cylinder to permit reciprocation of the wrist pin therethrough, a combustion chamber cooling jacket to supply coolant for the combustion chamber including an outlet duct connected to transfer heated coolant from the combustion chamber cooling jacket to supply energy to an internal combustion exhaust fired steam generator having a steam outlet connected to supply steam to the steam expansion chamber through the steam admission valve and said steam expansion chamber having an exhaust outlet connected to a steam condenser.

2. The engine of claim 1 wherein the cooling jacket has a steam outlet duct and the steam outlet duct is connected for transferring steam produced by evaporative cooling within the cooling jacket of the engine to the steam generator for heating the steam produced in the cooling jacket.

3. The engine of claim 1 wherein steam exhausted from the steam expansion chamber of the engine is connected in heat-exchange relationship with coolant passing out of the cooling jacket to the steam generator to transfer heat from the exhausted steam to the coolant that is supplied to the steam generator.

4. The engine of claim 1 wherein the engine is constructed and arranged for the piston to recompress residual steam throughout substantially an entire inward stroke of the piston.

5. The engine of claim 1 having a steam exhaust valve in the cylinder sidewall for enabling steam to be exhausted through the cylinder sidewall when the steam expansion chamber is expanded and thereafter an inward movement of the piston recompresses residual steam therein substantially to steam admission pressure.

6. The engine of claim 1 wherein the steam admission valve comprises a pair of separate and independently movable inwardly retractable poppet valves mounted in the cylinder cap to communicate in series, the cylinder cap being located within the piston and a control is connect to at least one steam admission valve for determining the steam mass supplied to the steam chamber during each outward stroke of the piston.

7. The apparatus of claim 1, wherein the piston has a skirt including a cylindrical liner sleeve secured therein that is in spaced relationship in places from an interior wall of the piston and the sleeve has an inner surface that is slidably and sealingly engaged over the fixed cylinder cap.

8. An apparatus for recovering waste combustion heat from a combustion chamber of an engine comprising,
   an internal combustion engine,
   at least one cylinder with a piston slidably and sealingly mounted in the cylinder and operatively connected to a crankshaft,
   a fixed cylinder head within the piston,
   the piston having a cylindrical liner sleeve mounted within a skirt portion of the piston and the liner sleeve having an inner surface that is slidably and sealingly engaged over the fixed cylinder head for defining a steam expansion chamber between the cylinder head and the piston;
   a heater for a working fluid connected to an exhaust pipe to receive combustion gas from the internal combustion engine for heating the working fluid to provide a pressurized vapor, and
   a duct connected to the heater for injecting the pressurized vapor from the heater into the expansion chamber to power the piston for imparting rotation to the crankshaft.

9. The apparatus of claim 8, wherein the liner sleeve is secured within the piston and is spaced apart from at least a portion of an interior wall of the piston.

10. The apparatus of claim 9, wherein the sleeve is spaced apart from the interior wall of the piston by a plurality of ribs that extend radially between the skirt and the sleeve.

11. The apparatus of claim 10, wherein the ribs encircle the sleeve and have chambers therebetween.

12. A combined cycle engine comprising at least one cylinder having a combustion piston slidably mounted therein between a combustion chamber and a steam expansion chamber wherein the combustion chamber is outward of the piston and the steam expansion chamber is located inside the piston between the piston and a fixed cylinder cap that is slidably and sealingly mounted inside the piston, connectors located on opposing sides of a skirt of the piston are positioned inward of a surface of the cylinder cap which comprises a wall of the steam expansion chamber such that the connectors are both located on an opposite side of the cylinder cap from the expansion chamber, a wrist pin is secured between the connectors and is connected to an outer end of a connecting rod, the cylinder cap has a support with at least one opening to accommodate reciprocation of the wrist pin therethrough, a steam supply heated by waste combustion heat is connected to power the engine by supplying steam to the steam expansion chamber through at least one steam inlet valve connected in communication with the expansion chamber through the cylinder cap, a steam exhaust valve that remains closed after top dead center for recompressing residual steam during each inward stroke of the piston and a crankshaft is connected to an inner end of the connecting rod.

13. The engine of claim 12 including an auxiliary clearance chamber within the engine that is connected to the steam expansion chamber.

14. The engine of claim 12 wherein the at least one steam inlet valve comprises a pair of separate and independently movable inwardly retractable poppet valves connected to communicate in series for opening when moved inwardly and a phase control for regulating an overlapped opening thereof.

15. The apparatus of claim 1 wherein at least one such valve is a bump valve that is actuated by a bumping force applied thereto by movement of the piston.

16. A combined cycle engine comprising, at least one cylinder having a combustion piston slidably and sealingly mounted therein between a combustion chamber and a steam expansion chamber, the piston including a piston skirt, the combustion chamber being outward of the piston and including a combustion intake valve and a combustion exhaust valve, the steam expansion chamber being located in the cylinder inward of the piston, at least one steam inlet valve enclosed by the piston and connected to be operated in timed relationship to piston movement for admitting steam produced by waste combustion heat into the steam expansion chamber through a fixed cylinder cap having a part thereof that is sealingly and slidably mounted within the piston, at least one port for communicating with the expansion chamber to exhaust steam therefrom, the piston having at least one connector element at an inner part of the piston skirt which is located inwardly beyond the part of the cylinder cap that is sealingly associated with the piston such that the connector element is on an opposite side of the cylinder cap from the steam expansion chamber, a connecting rod that is moveable along a central longitudinal axis of the cylinder is coupled at an outer end thereof to the connector element and a crankshaft is located inwardly of the piston and is connected to an inner end of the connecting rod.

17. The engine of claim 16 wherein there are a pair of connector elements and a wrist pin is connected between the connector elements and passes through an outer end of the connecting rod.

18. The engine of claim 16 wherein the steam inlet valve comprises a pair of separate and independently moveable poppet valves connected to communicate in series and having distal seats, and
   wherein the poppet valves are retractable sequentially for opening when moved proximally within the piston to admit steam into the steam expansion chamber through an admission port in the cylinder cap.

19. The engine of claim 16 including a control operatively associated with the steam inlet valve to regulate the mass of steam introduced into the steam expansion chamber during each power stroke of the piston.

20. The combined cycle engine of claim 16 wherein the steam inlet valve comprises a pair of separate and independently moveable inwardly retractable poppet valves that are concentric to one another wherein one of the poppet valves has a central longitudinal bore and the other poppet valve is slidably mounted therein and a valve control is connected to regulate sequential operation thereof.

21. The engine of claim 16 wherein the engine is constructed and arranged for inward strokes of the piston to recompress residual steam remaining after steam is exhausted from the cylinder.

22. The engine of claim 21 including an auxiliary clearance chamber in the engine that is connected to the steam expansion chamber.

23. The engine of claim 16 that includes a steam exhaust valve having a port through a sidewall of the cylinder at a location in the cylinder sidewall that is outward of the cylinder cap for exhausting steam across an exposed surface of the cylinder cap when the piston is at a top center position.

24. The engine of claim 23 wherein the exhaust valve is an automatic valve comprising an exhaust opening in the piston skirt that enables steam to be exhausted through the piston at a top center position which locates the exhaust opening in alignment with the exhaust port outward of the cylinder cap.

25. The engine of claim 16 wherein the steam supply is connected to transfer steam directly to the steam inlet valve through a duct that maintains steam from the steam supply in heat transfer relationship with the cylinder cap substantially only at the steam inlet valve.

26. The engine of claim 16 wherein the cylinder cap has a cylindrical surface that is provided with a compression ring to produce a slidable seal with an inner cylindrical surface of the piston, a steam chamber is provided within the cylinder cap and the wrist pin is located inwardly of the steam chamber.

27. The engine of claim 16 including a combustion chamber cooling jacket that has a steam outlet and a steam outlet duct is connected to the steam outlet of the cooling jacket for transferring steam produced by evaporative cooling within the cooling jacket of the engine to the steam supply for heating the steam that was produced in the combustion chamber cooling jacket.

28. The engine of claim 16 wherein the cylinder cap has a steam chest positioned outward of the wrist pin for steam jacketing the cylinder cap.

29. The engine of claim 16 wherein said engine is mounted in a vehicle, the engine is connected to an electric generator to provide electric current to a storage unit comprising a battery or a capacitor and an electric motor is connected to the storage unit or generator to drive the wheels of the vehicle.

30. The engine of claim 16 wherein the steam outlet of the steam generator is coupled to the cylinder cap so as to control heat flux to the cylinder cap for heating of the cylinder cap at a rate that is less than that produced by jacketing the cylinder cap with the steam from the steam generator.

31. The engine of claim 16 wherein a combustion chamber cooling jacket is coupled in a steam supply circuit that is connected to power the engine, said circuit including a passage connected to transfer combustion chamber coolant from a combustion chamber cooling jacket to an internal combustion exhaust powered steam generator that has a steam outlet connected to supply steam to the steam expansion chamber, said expansion chamber having an exhaust outlet connected to a condenser that has a condensate outlet connected to recycle the coolant back to the cooling jacket in a closed loop.

32. The engine of claim 16 wherein the engine has a cooling jacket with a steam outlet and a steam duct is connected to the steam outlet of the cooling jacket for transferring steam produced by evaporative cooling within the engine cooling jacket to a heater for superheating steam from the cooling jacket by means of hot exhaust gasses from the combustion chamber.

33. The engine of claim 16 having a steam exhaust valve in the cylinder sidewall for enabling steam to be exhausted through the cylinder sidewall when the steam expansion chamber is fully expanded and is closed thereafter such that subsequent inward movement of the piston recompresses residual steam therein during each inward stroke of the piston.

34. The engine of claim 16 including a steam collection ring mounted within a groove in the cap that communicates with a steam transfer duct for capturing escaping blow-by steam before such blow-by steam is released within the engine.

35. The apparatus of claim 16, wherein the piston has a skirt that includes a cylindrical liner sleeve secured therein within an interior wall of the piston and the sleeve has an inner surface that is slidably and sealingly engaged over the fixed cylinder cap.

36. The apparatus of claim 16 wherein the inlet valve is a bump valve that is opened by a bumping force applied thereto by piston movement.

* * * * *